SEMICONDUCTOR CONDITION RESPONSIVE PHASE SHIFT OSCILLATORS

Filed Sept. 13, 1966

2 Sheets-Sheet 1

INVENTOR.
JOSEPH T. MAUPIN
BY Omund R. Dahle
ATTORNEY

INVENTOR.
JOSEPH T. MAUPIN
BY Donald R. Stone
ATTORNEY

United States Patent Office 3,345,582
Patented Oct. 3, 1967

3,345,582
SEMICONDUCTOR CONDITION RESPONSIVE PHASE SHIFT OSCILLATORS

Joseph T. Maupin, Deephaven Village, Minn., assignor to Honeywell Inc., Minneapolis, Minn., a corporation of Delaware Filed Sept. 13, 1966, Ser. No. 584,300
11 Claims. (Cl. 331—108)

ABSTRACT OF THE DISCLOSURE

A condition responsive phase shift oscillator utilizing a distributed resistance-capacitance null network feedback element. A monolithic integrated circuit form of the invention is disclosed.

Figure 1:
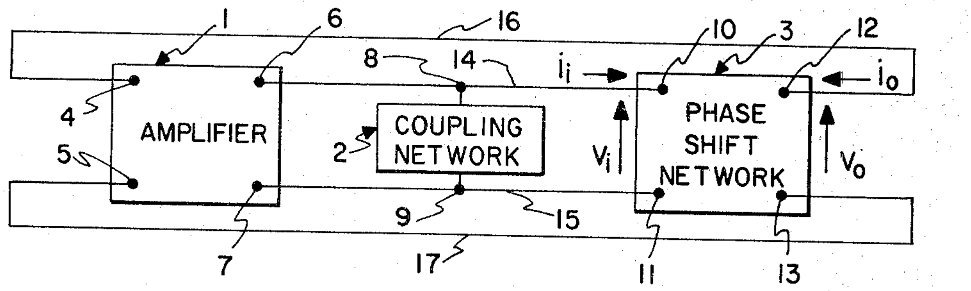

This invention relates to semiconductor oscillators and more particularly to condition responsive phase shift oscillators and is a continuation-in-part of my copending application S.N. 359,837, filed Apr. 15, 1964, entitled Semiconductor Condition Responsive Phase Shift Oscillators, now abandoned, and assigned to the same assignee as the present application.

My invention utilizes the gain and phase shift properties of a distributed resistance-capacitance null network feedback element in a phase shift oscillator. It has been suggested before that such networks might be used in condition responsive oscillators. Problems have been encountered in building of such an oscillator, however. The heretofore unsolved problems have been the tendency for the apparatus to break slowly into oscillations rather than snapping from the off to the on condition, the tendency of the frequency of oscillation to wander over a fairly wide range, and lack of precision in the threshold or boundary between on and off. My invention overcomes these prior art difficulties.

Others have attempted to construct a condition responsive phase shift oscillator in a semiconductor integrated device. Such attempts have been generally unsuccessful for the reasons indicated above. My invention provides circuits suitable for integration in a single semiconductor chip.

My invention utilizes an amplifier, a coupling network and a condition responsive phase shift network in the amplifier feedback loop to achieve an oscillator. It has been discovered that such an oscillator can be constructed to avoid the shortcomings of the prior art if the phase shift network is operated in the transimpedance or transadmittance modes. Prior art oscillators had been constructed so as to operate the phase shift network in the voltage mode. The phase shift network can be forced to operate in transimpedance mode or the transadmittance mode by proper design of the input and output impedance characteristics of the phase shift network and the impedances of certain other elements of the circuit.

As used in this specification, the transimpedance mode and the transadmittance mode of operation will be defined in terms of network transfer functions for a generalized four terminal network. The transimpedance mode is that achieved when the network transfer function is the output voltage of the network divided by the input current of the network when the output current is zero, i.e.

$$\left.\frac{v_o}{i_i}\right|_{i_0=0}$$

This mode can be achieved if the input impedance of the phase shift network is low compared to the effective impedance connected across the input of the network and if the output impedance of the phase shift network is low compared to the effective impedance connected across it. The transimpedance mode may also be obtained if the input impedance of the phase shift network is low compared to the output impedance of the amplifier and is matched in phase angle to the impedance of the coupling network and if the output impedance of the phase shift network is low compared to the input impedance of the amplifier. The transadmittance mode of operation is that achieved when the network transfer function is the output current divided by the input voltage when the output voltage is zero, i.e.

$$\left.\frac{i_o}{v_i}\right|_{v_0=0}$$

The transadmittance mode is achieved when the input impedance of the phase shift network is high compared to the effective impedance connected across the network input circuit, and the output impedance of the phase shift network is high compared to the effective impedance connected across the network output circuit. For these modes of operation, impedances can be considered low or high relative to one another if they differ by a factor of three or more. More satisfactory behavior will be achieved if the impedances differ by a factor of ten or more.

The transimpedance mode of operation is useful in connection with both resistance controlled and capacitance controlled null type phase shift networks. The transadmittance mode of operation is particularly useful with capacitance controlled phase shift networks.

Figure 2:
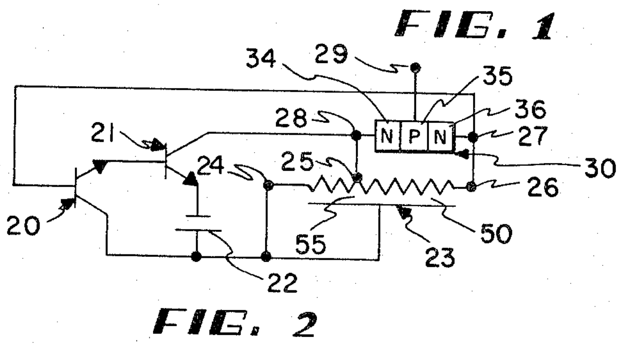
Figure 6:
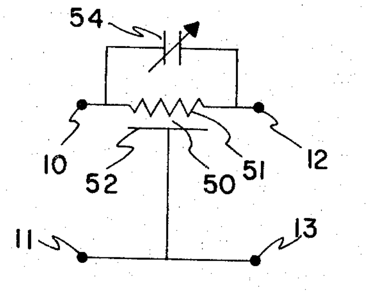
Figures 3, 4, 5:
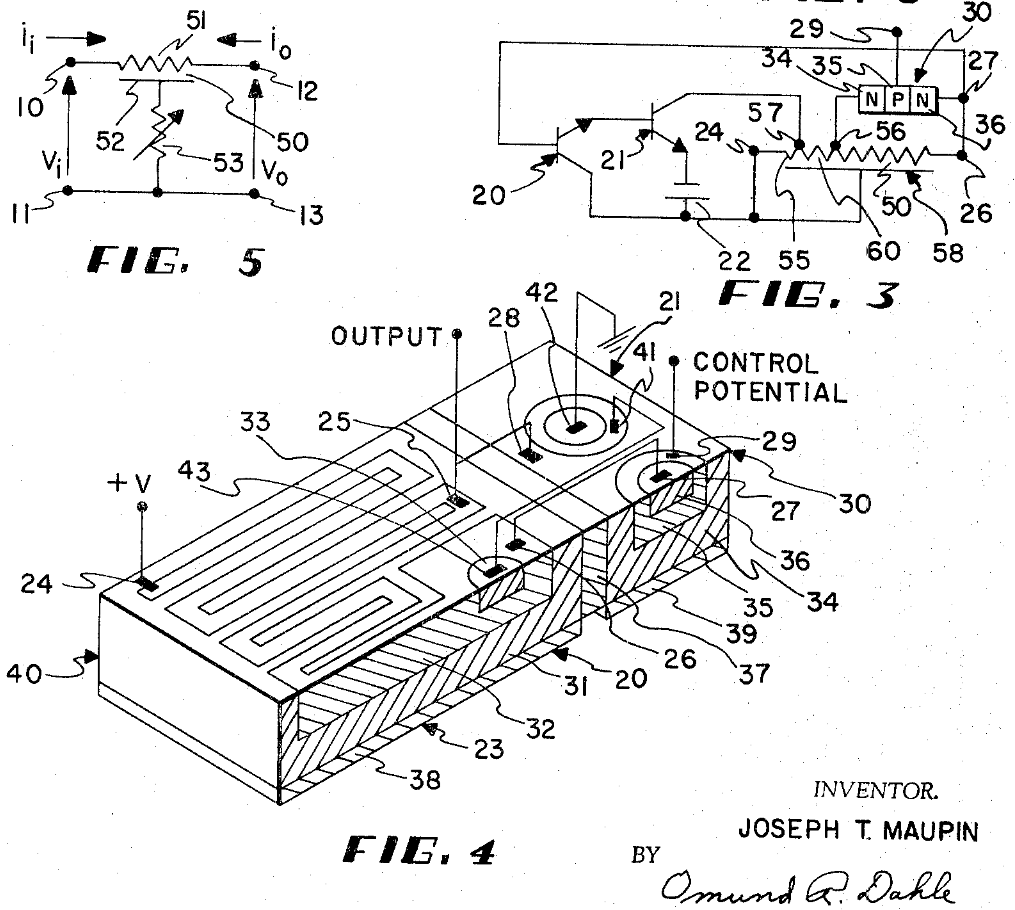
Figure 7:
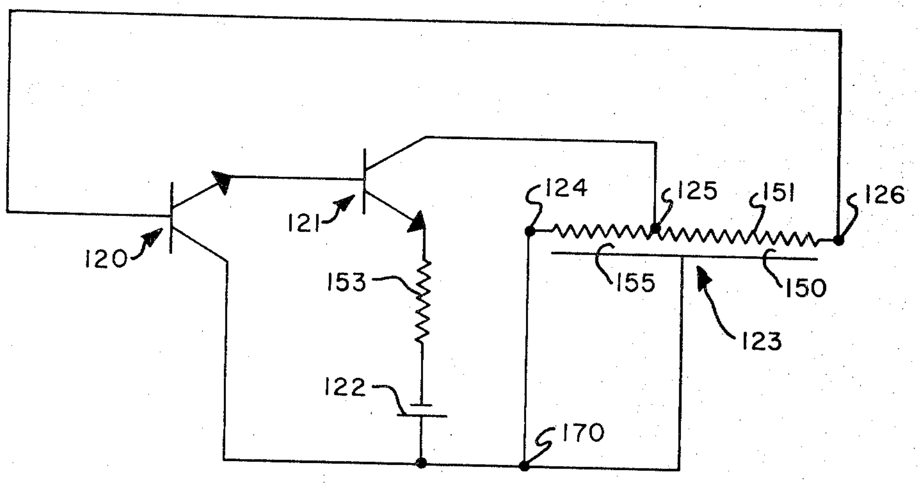

The foregoing and other features of this invention will be best understood by reference to the following description taken in conjunction with the accompanying drawings, wherein:

FIGURE 1 is a block circuit diagram utilizing the present invention; FIGURE 2 is a schematic circuit diagram of one embodiment of the present invention; FIGURE 3 is a schematic circuit diagram of a further embodiment of the present invention; FIGURE 4 is a diagrammatic perspective view of a semiconductor chip illustrating an integrated version of the embodiment of FIGURE 2; FIGURE 5 is a schematic diagram of one phase shift network suitable for use in the invention; FIGURE 6 is a schematic diagram of another phase shift network suitable for use in the invention; and FIGURE 7 is a schematic circuit diagram of a variable frequency oscillator utilizing the invention.

My invention can best be understood by reference first to FIGURE 5, which shows a resistance controlled condition responsive phase shift network (R-network) suitable for use in my invention. A distributed resistance-capacitance (RC) region, generally designated 50, has a resistive area (R) 51 and a capacitive area (C) 52. A condition responsive element, here shown as a variable resistor ($R_2$) 53 has one end connected to capacitive area 52 and the other end common to an input circuit and an output circuit of the R-network. This R-network can be characterized as a four terminal network having an input circuit between points 10 and 11 and an output circuit between points 12 and 13. The condition responsive element in such a network could also be a variable capacitor. Resistive area 51 may be used as a condition responsive element in this network in addition to, or instead of resistor 53 if desired.

The R-network of FIGURE 5 is a symmetrical network. Therefore, its input and output impedances are identical and may be called the characteristic impedance of the network. This R-network is also a null network having a null frequency ($\omega_0$) defined by the equation:

$$\omega_0 RC = 11.1$$

The null characteristic of the R-network is not important to this invention, but the null frequency ($\omega_0$) is, for it is the frequency at which the R-network will contribute a $-180°$ phase shift to a signal applied across its input circuit under the proper conditions.

In one aspect of my invention, the R-network of FIGURE 5 is operated in the transimpedance mode. This mode of operation may be achieved by designing the characteristic impedance of the R-network to be relatively low compared to the effective impedances connected across the input and output circuits of the network. Near the null frequency, the characteristic impedance of the R-network is approximately the characteristic impedance of the distributed RC region within the network. The R-network characteristic impedance near that frequency may thus be chosen by adjustment of the magnitudes of R and/or C.

The R-network of FIGURE 5 has the following critical ratio of resistances for certain phase shifts:

$$R/R_2=17.7$$

In the transimpedance mode of operation, if that ratio is less than 17.7 the R-network will not provide a phase shift of $-180°$ at any frequency. (Phase shift at the null frequency will be 0°.) In the same mode, if the ratio is equal to, or greater than 17.7 the R-network will always provide exactly $-180°$ phase shift at the null frequency regardless of the amount by which the ratio exceeds the critical value. This property is not true of the other modes and prior art circuits. The value of the ratio may be changed by application of strain, potential, etc. to an appropriately responsive resistor 53, resistive area 51, or a combination of both. It can therefore be seen that, in the transimpedance mode, the R-network has a very critical ratio above which it will always provide $-180°$ phase shift at the same frequency ($\omega_0$) and below which it will not have $-180°$ phase shift for any frequency.

Referring now to FIGURE 6, there is shown a capacitance controlled condition responsive phase shift network (C-network) suitable for use in my invention. Distributed RC region 50 has a condition responsive element, here shown as variable capacitor ($C_2$) 54 connected across the ends of resistive area 51. Capacitive area 52 may be used as a condition responsive element in this network in addition to, or instead of, capacitor 54. This C-network may be characterized as a symmetrical four terminal network, having a characteristic network impedance only slightly different from the characteristic impedance of distributed RC region 50. The C-network of FIGURE 6 is also a null network with a null frequency defined by the same equation as that of the R-network.

In a further aspect of my invention, the C-network of FIGURE 6 is operated in the transimpedance mode. This may be achieved by the same choice of impedances as in the case of the R-network. The C-network may also be operated in the transimpedance mode if a coupling network, connected across the input circuit of the C-network, is impedance matched to the characteristic impedance of the C-network. Specifically, such a coupling network must have an impedance with a phase angle substantially identical to that of the characteristic C-network impedance at the frequency of interest. Such a coupling network is provided by an extension of the RC region.

The C-network of FIGURE 6 is ratio controlled in a manner similar to that of the R-network. The critical ratio is $$C/C_2=17.7$$

The phase relationships are not quite as precise as those for the R-network, however. For $C/C_2$ less than 17.7 and the C-network operating in the transimpedance mode, the phase shift at the null frequency will be from 0° to $-13.4°$. In the same mode and at the same frequency, for $C/C_2$ equal to or greater than 17.7, the phase shift will be between $-180°$ and $-203.4°$ depending upon the amount by which the ratio exceeds the critical value. The value of the ratio is changed by application of strain, potential, etc. to an appropriately responsive capacitor

54, capacitive area 52, or a combination of both. For the C-network there will not be $-180°$ phase shift at any frequency if the critical ratio is less than 17.7. If the ratio equals or exceeds 17.7, there will be $-180°$ phase shift for some frequency very near the null frequency. Though the frequency of which $-180°$ phase shift occurs varies slightly with the magnitude of the $C/C_2$ ratio, it varies over a significantly smaller range of frequencies than prior art devices. This decreased range is critical, especially in integrated structures, where impedance matching must be used to match the phase angles of the C-network characteristic impedance and a coupling impedance over the possible range of frequencies of interest.

In another aspect of my invention, the C-network of FIGURE 6 is operated in the transadmittance mode. This mode may be achieved by designing the characteristic impedance of the C-network to be relatively high compared to the impedances across the input and output circuits of the C-network. When operated in the transadmittance mode, the C-network will always provide $+90°$ phase shift at the null frequency if $C/C_2$ is less than 17.7, and will always provide $-90°$ phase shift at the null frequency when $C/C_2$ equals, or exceeds 17.7, regardless of the amount by which the ratio exceeds the critical value. No other mode or prior art circuit exhibits this property. Since the C-network is symmetrical, another symmetrical network having a substantially identical characteristic impedance phase angle may be connected across the input or output circuit of the C-network and considered an extension of the same four terminal phase shift network. R and/or C are adjusted to give large magnitudes, and a suitable length extension of RC region 50 chosen so as to contribute exactly $-90°$ phase shift at the null frequency. It has been shown that an RC extension two-thirds as long as RC region 50 will contribute the proper phase shift. Such a network can operate in the transadmittance mode, and will contribute 0° phase shift or $-180°$ phase shift at the null frequency depending upon whether or not $C/C_2$ is less than 17.7.

The invention combines the novel modes of operation of the above described phase shift networks with amplifying means and coupling network means to obtain novel oscillators like that shown in FIGURE 1. In FIGURE 1, an amplifier and a phase shift network 3 are shown as four terminal networks. Also shown is a two terminal coupling network 2. Amplifier 1 exhibits an input impedance between points 4 and 5 and an output impedance between points 6 and 7. Phase shift network 3 exhibits a characteristic impedance between points 10 and 11 and between points 12 and 13. Coupling network 2 has terminals 8 and 9. An output circuit of amplifier 1 can be traced from point 6 through conductor 14, the parallel combination of the two terminal coupling network 2 and the characteristic impedance between points 10 and 11 of the phase shift network 3, then through conductive means 15 to point 7, and through the output impedance of amplifier 1 to point 6. An input circuit of amplifier 1 can be traced from point 4 through conductor 16, the characteristic impedance between points 12 and 13 of phase shift network 3, then through conductive means 17 to point 5, and through the input impedance of amplifier 1 to point 4. The input voltage ($v_i$), the input current ($i_i$), the output voltage ($v_o$), and the output current ($i_o$) and their respective directions are shown by the arrows on FIGURE 1. These four parameters refer to the four terminal phase shift network 3. Coupling network 2 exhibits a coupling impedance between terminals 8 and 9. Amplifier 1 may be any one of a number of different amplifiers. If high input impedance is gain derived, the only requirements are that there is sufficient current gain to achieve a relatively high input impedance, that the output signal is 180° out of phase with the input signal and that the output impedance is high. The mode of operation may then be determined by suitably defining the impedance of phase shift network 3. Phase shift network 3 may be either resistance or capacitance controlled and may be one of those shown in FIGURES 5 and 6 as well as other types. Coupling network 2 may be resistive with a reactive component depending on particular requirements of the circuit.

The on-off control point of oscillators utilizing the invention will be quite predictable and stable because the −180° phase shift contributed by phase shift network 3 always occurs at or very near the null frequency. If amplifier 1 exhibits transconductance ($g_m$) at the operating frequency, the coupling impedance is high, and the phase shift network 3 is resistance controlled and operating in the transimpedance mode, Nyquist's criterion for instability will be exceeded and the oscillator will be on if and only if:

$$g_m R\left(\frac{R_2}{R}-\frac{1}{17.7}\right)\leq -1 \quad (1)$$

For an oscillator utilizing the capacitance controlled network in the transadmittance mode, the criterion for off-on control takes the same form as that above except that $C_2/C$ is substituted for $R_2/R$ and a numerical constant is inserted on the left side.

For an oscillator utilizing the capacitance controlled network in the transimpedance mode, it will be on if and only if:

$$\frac{g_m R\left(\frac{C_2}{C}-\frac{1}{17.7}\right)}{\left[1+3\pi\frac{C_2}{C}+2\frac{C_2}{C}3\pi^2\right]^{1/2}}\leq -1 \quad (2)$$

The accuracy of (2) is somewhat less than (1), which is completely rigorous, due to the aforementioned slight deviation in phase shift from −180° in the C-network as a function of $C_2/C$. If the coupling network impedance is not high, but matches the impedance of the null network, the only change occurring in the above expressions is a multiplication of the left hand sides by a factor of ½.

It can be seen from Equations 1 and 2 that the on-off threshold is not the critical ratios, but exceeds the critical ratios. The exact point is determinable from the Equation 1 or 2. Prior art structures do not exhibit these relatively simple relations, so that an on-off point is much more difficult to predict.

Referring now to FIGURE 2, a preferred embodiment of the present invention utilizing the transimpedance mode of operation is shown. A first NPN transistor 20 has its emitter connected to the base of a second NPN transistor 21. The emitter of transistor 21 is connected to the negative terminal of a source of energy, here shown as battery 22. The positive terminal of battery 22 is connected to the collector of transistor 20. A distributed resistance-capacitance region, generally designated 23, has connection means, here shown as terminals 24 and 26, on opposite ends of a resistive area of region 23 and connection means, here shown as terminal 25, intermediate the ends of region 23. Terminal 25 divides region 23 into portions 50 and 55. A condition responsive element 30 is here shown as a voltage variable capacitance including a N-type semi-conductive region 34, a P-type region 35, and an N-type region 36 and having a terminal 27 on region 36, a terminal 28 on region 34, and a control terminal 29 on region 35. For example, a 2N708 transistor may be used as variable capacitor element 30. Terminal 28 is connected to terminal 25 and terminal 27 is connected to terminal 26. A source of control potential, not shown is connected across terminal 29 and a reference point in the circuit. The reference point may be any one of several, including terminals 24, 25, 27 and 28. Terminals 26 and 27 are connected to the base of transistor 20 by a conductive means. Terminal 24 extends across the capacitive barrier to the distributed capacitance of region 23 to short one end of the resistive area of RC portion 55 to the capacitive area of RC portion 55.

Distributed RC network 23 may be either a semiconductive or a thin film distributed network. Portion 50 of distributed network 23 and condition responsive element 30 form the phase shift network. Phase shift networks like that shown in FIGURE 5 may also be used. Referring again to FIGURE 2, portion 55 of RC region 23 forms the coupling network. A high impedance resistor may be substituted for portion 55.

The circuit of FIGURE 2 utilizes the phase shift network operating in the transimpedance mode. The characteristic impedance of the phase shift network is designed to be low compared to the impedance appearing between the collector of transistor 21 and the positive terminal of battery 22. Portion 55 exhibits a coupling impedance having the same phase angle as the characteristic impedance of the phase shift network at the oscillation frequency. The characteristic impedance of the phase shift network is also low compared to the input impedance of the amplifier appearing between the base and the collector of transistor 20. Portion 55 of RC region 23 was used as the coupling impedance in this embodiment so that the circuit could be integrated on a semiconductor chip as shown in FIGURE 4. Use of portion 55 as the coupling network increases the amplifier gain required to sustain oscillations but does not change the mode of operation of the phase shift network. If the impedance of portion 55 is approximately equal to the characteristic impedance of the phase shift network, the amplifier must produce twice the transconductance required to sustain oscillations in the circuit when a relatively high resistance is used. It has been found that the two transistor amplifier shown in FIGURE 2 provides sufficient gain to achieve an operable apparatus.

In the circuit of FIGURE 2, a signal reaching the base of transistor 20 will be amplified and the phase shifted by 180° upon emergence from the collector of transistor 21. The phase shift network formed by portion 50 of RC region 23 and potential responsive capacitor 30 form a feedback path for the output signal to the base of transistor 20 which has the same form as FIGURE 6. The phase shift and gain contributed by the phase shift network will be determined by the potential applied at terminal 29 to vary the capacitance ($C_2$) of potential responsive capacitor 30. Denoting the distributed capacitance of portion 50 as C, small variations in potential applied to terminal 29 turn the oscillator off and on by varying $C_2/C$ back and forth across the threshold value obtained from Equation 2. The direct current operating point, and thus the power dissipation of this circuit is controlled by the phase shift network and coupling network resistances, for they perform a second function as bias resistors for the amplifier. The circuit of FIGURE 2 is particularly useful, for the resistive area of RC region 23 controls the DC bias point and the transconductance of the amplifier to make the product $g_m R$ independent of R. In this circuit, the on-off oscillation criterion is completely independent of the magnitude of the resistance in region 23. On-off control is determined only by C and $C_2$. The resistance affects only the frequency of oscillation.

FIGURE 4 diagrammatically illustrates one layout for integrating the circuit of FIGURE 2 on a single crystal chip 40 of silicon or other semiconductive material. An N-type region 31 forms the collector of transistor 20 and the N-side of a distributed PN junction capacitance in distributed RC region 23. A metalized region 38 covers the lower surface of region 31 to reduce lateral resistance. A P-type region 32 forms the base of transistor 20, the resistive area of RC region 23 and the P side of distributed P junction capacitance in RC region 23. Region 32 may be formed by well known diffusion processes. An N-type region 33 forms the emitter of transistor 20 and may be formed by well known diffusion processes. Transistor 21 and variable capacitor 30 are separated from transistor 20 and RC region 23 by a P-type isolation region 37. Region 37 is connected into the circuit so that the junctions between regions 37 and 34 and between 37 and 31 are both reverse biased. N-type region 34, P-type region 35, and N-type region 36 form a voltage variable capacitor 30 if operated with both junctions reverse biased. Region 34 also serves as the collector of transistor 21 and may be an extension of region 31 which has been isolated by the isolation diffusion. A metalized area 39 covers the entire lower surface of region 34 to reduce lateral resistance. Area 39 lowers the lateral resistance across region 34 but is not essential to operation of the device. P-type regions 32, 35 and the base of transistor 21 may all be formed in one diffusion step. N-type regions 33, 36 and the emitter of transistor 21 may all be formed in a second diffusion step. Ohmic contacts and leads may then be added to the chip using well known deposition and etching techniques. A contact 41 on the base of transistor 21 is conductively connected to a contact 43 on the emitter of transistor 20. A contact 42 on the emitter of transistor 21 is connected to the negative terminal of battery 22, here shown as ground.

An external capacitance control or transducer may be used in place of the voltage controlled capacitance 30 by bringing out the appropriate leads and omitting the internal connections to 30. Any one of the four modes of operation of the phase shift network (i.e. voltage $$\left[\frac{v_2}{v_1}\bigg| i_2=0\right]$$

current $$\left[\frac{i_2}{i_1}\bigg| v_2=0\right]$$

transimpedance, or transadmittance) can be achieved in an integrated structure like that of FIGURE 4 by suitable design of the impedances of the elements.

FIGURE 3 discloses a circuit utilizing a capacitance controlled null network in the transadmittance mode of operation. Distributed RC region 58 has portions 50, 55, and 60. Portion 50 is the distributed RC for the null network; region 60 is an additional phase shift network providing —90° phase shift at the null frequency, and region 55 is the coupling network.

A terminal 56 on RC region 58 defines the point common to portions 50 and 60. A terminal 57 on RC region 58 defines the point common to portions 55 and 50. Condition responsive element 30 is shown connected across portion 50. It has been found that the circuit is operable with element 30 connected across terminals 26 and 57 as well, but less precision in on-off control and frequency results. The characteristic impedance of the combination of distributed RC portions 50 and 60 is designed to be relatively high compared to the amplifier input impedance and the coupling impedance. Thus it can be seen that the phase shift network characteristic impedance has a similar comparative relation to the effective impedances connected across the phase shift network input and output circuits.

The comparative lengths of portions 50, 55 and 60 are quite critical in this embodiment. If the length of portion 50 from point 56 to point 26 is denoted L, then portion 60 should have length ⅔L and portion 55 should have length less than .05L. On-off control is achieved in the same manner as in the circuit of FIGURE 2. The oscillation frequency will be the null frequency, and frequency variation due to non-linear limiting is minimized.

The oscillator disclosed in FIGURE 7 is a free running, variable frequency oscillator operable in the transimpedance mode. The oscillation frequency is controlled by a condition responsive R-network similar to that disclosed in FIGURE 5. The network comprises a portion 150 of a distributed RC line 123 and a lumped resistor 153. The distributed resistance 151 of RC portion 150 is the condition responsive element in this circuit. A portion 155 of distributed RC line 123 forms the coupling network and has point 124 connected to a point 170 between the distributed capacitance and the lumped resistor 153. It has been found that the circuit, as shown, provides the desired condition responsive phase shift network. Consideration of the AC currents in the emitter-collector circuit of transistor 121 show that resistor 153 has twice the effect, when placed as shown, that it would have if connected between the distributed capacitance and point 170. Since the input impedance of transistor 120 is high, very little AC collector current from transistor 121 flows from point 126 to the base of transistor 120, so essentially all the current flows through resistor 153 and either RC portion 155 or RC portion 150. It has been discovered that if coupling portion 155 is electrically long (i.e. long enough to act as a distributed element rather than a lumped element), the current splits nearly equally through portions 150 and 155. Therefore, resistor 153 carries essentially the full collector AC current, whereas if positioned between the distributed capacitance of portion 150 and point 170, it would carry ½ that current. Positioning resistor 153 as shown in FIGURE 7 does not otherwise affect the AC operation of the circuit.

The free running oscillator of FIGURE 7 is designed for use as a pressure sensitive, variable frequency oscillator. The RC line 123 may be formed of semiconductive material exhibiting a piezoresistive effect so that small pressure changes cause changes in the magnitude of the resistance of distributed region 151, thereby changing the oscillation frequency of the device. The resistance values in the circuit of FIGURE 7 are chosen so that the device oscillates over the entire range of resistances exhibited by the distributed resistance 151 (i.e. the critical ratio is always exceeded and the gain requirements are met). The oscillation frequency of the device is identical to the null frequency $\omega_0$ which is seen to vary inversely with the magnitude of the resistance of distributed region 151, i.e., $$\omega_0-\left(\frac{1}{R}\right)\left(\frac{11.1}{C}\right)$$

This oscillator exhibits advantages over those operable in the voltage mode because its oscillation frequency is independent of the magnitude of the resistance ratio whereas that of voltage mode devices is not.

The embodiments of the invention in which an exclusive property or right is claimed are defined as follows:

1. In a controllable oscillator having amplifying means including input circuit means and output circuit means, the amplifying means exhibiting an input impedance and an output impedance and generating an output signal which is applied to controllable resistance-capacitance phase shift network means, the phase shift network means providing a phase shifted signal and applying it to the amplifying means for controlling the amplifying means, the improvement comprising:

the phase shift network means including a condition responsive distributed resistance-capacitance phase shift network exhibiting a characteristic impedance having the same comparative magnitude relation to both the amplifying means input and output impedances thereby causing the phase shift network means to operate in one of a transimpedance mode and a transadmittance mode;

coupling network means exhibiting a two terminal impedance with at least one of a predetermined magnitude relation, and a substantially identical phase angle, compared to the characteristic impedance at the oscillation frequency so that the mode of operation is determined by the relation between the characteristic impedance and the amplifying means impedances; and means connecting the coupling network means in circuit with the amplifying means to output circuit means.

2. An oscillator according to claim 1 wherein the coupling network means comprises a distributed resistance-capacitance element having one end of the distributed resistance thereof shorted to the distributed capacitance thereby forming a two terminal impedance between the ends of the distributed resistance.

3. An oscillator according to claim 1 wherein:
the phase shift network means includes a condition responsive impedance element and a distributed resistance-capacitance region and exhibits a characteristic impedance of relatively low magnitude compared to the amplifying means input and output impedance magnitudes; and
the coupling network means impedance includes at least one of a relatively high magnitude, and a substantially identical phase angle, compared to the phase shift network means characteristic impedance at the oscillation frequency so that the phase shift network mean operates in a transimpedance mode.

4. An oscillator according to claim 1 wherein:
the phase shift network means includes a condition responsive impedance element and a distributed resistance-capacitance region and exhibits a characteristic impedance of relatively high magnitude compared to the amplifying means input and output impedance magnitudes; and
the coupling network means impedance has a relatively low magnitude compared to the phase shift network means impedance at the oscillation frequency so that the phase shift network means operates in a transadmittance mode.

5. An oscillator according to claim 1 wherein:
the phase shift network means includes lumped impedance means and a condition responsive distributed resistance-capacitance region and exhibits a characteristic impedance of relatively low magnitude compared to the amplifying means input and output impedance magnitudes; and
the coupling network means impedance includes at least one of a relatively high magnitude, and a substantially identical phase angle, compared to the phase shift network means characteristic impedance at the oscillation frequency so that the phase shift network means operates in a transimpedance mode.

6. An oscillator according to claim 1 wherein:
the phase shift network means includes a first portion of a distributed resistance-capacitance region and condition responsive impedance means, and wherein
the coupling network means comprises a second portion of the distributed resistance-capacitance region from one end of the region to an intermediate point of the region, and which further comprises:
means, at the one end of the region, shorting one end of the distributed resistance thereof to the distributed capacitance;
means connecting the distributed resistance-capacitance region to the amplifying means input circuit means;
means connecting the second portion of the resistance capacitance region to the amplifying means output circuit means; and
conductive means connecting the condition responsive impedance means across at least a part of the distributed resistance of the first portion.

7. An oscillator according to claim 6 wherein:
the phase shift network means has a low characteristic impedance magnitude compared to the amplifying means impedance magnitudes,
the condition responsive impedance means is capacitive means, and
the conductive means connects the capacitive means across the entire distributed resistance of the first portion.

8. An oscillator according to claim 6 wherein:
the phase shift network means has a high characteristic impedance magnitude compared to the amplifying means impedances,
the condition responsive impedance means is capacitive means, and
the conductive means connects the capacitive means across only a part of the distributed resistance of the first portion.

9. An oscillator according to claim 1 wherein:
the distributed resistance-capacitance network includes lumped impedance means and a first portion of a distributed resistance-capacitance region, the distributed resistance being condition responsive, and wherein
the coupling network means comprises a second portion of the distributed resistance-capacitance region from one end of the region to an intermediate point of the region, and which further comprises:
means at the one end of the region shorting one end of the distributed resistance thereof to the distributed capacitance;
means serially connecting the second portion and the lumped impedance means to the amplifying mean output circuit means; and
conductive means connecting distributed resistance-capacitance region to the amplifying means input circuit means thereby providing a condition responsive, variable frequency, free running oscillator.

10. An integrated circuit element comprising a block of semiconductor material (40) having a first region (31) of a first conductivity type with first (20) and second (23) portions,
a second region (32) of a second conductivity with first (20) and second (23) portions separated from those of the first region by first and second parts of a first P-N junction,
and a third region (33) of the first conductivity type separated from the first portion of the second region by a second P-N junction whereby the first portions of the first and second region and the third region define the collector, base and emitter of a transistor respectively, the second portion of the second region defines the distributed resistance, and the second part of the first junction defines the distributed capacitance;
conductive means (24) shorting the distributed resistance to the distributed capacitance at a point remote from said transistor; and
an ohmic contact (38) to the collector contacting substantially the entire surface of the first region opposite the first junction.

11. An integrated phase shift oscillator comprising:
a block of semiconductor material (40) including a first region (31) of a first conductivity type with first (20) and second (23) portions,
a second region (32) of a second conductivity type with first (20) and second (23) portions separated from those of the first region by first and second parts of a first P-N junction,
a third region (33) of the first conductivity type separated from the first portion of the second region by a second P-N junction whereby the first portions of the first, second and third regions define the collector, base and emitter respectively of a transistor, the second portion (23) of the second region (32) defines the distributed resistance, and the second part (23) of the first junction defines the distributed capacitance of a distributed resistance-capacitance,
connection means electrically connecting one end of the distributed resistance to the base, said connection means being of said second conductivity semiconductive material,
a first ohmic contact (25) on the distributed resistance intermediate its ends,
second ohmic contact means (24) shorting one end of said distributed resistance to said capacitance,
a fourth region (34) of the first conductivity type, isolating means (37) positioned to electrically isolate the first and fourth regions and to form a unitary physical structure therewith;

fifth (35) and sixth (region under contact 41) regions of the second conductivity type positioned to form third and fourth junctions respectively with the fourth region, a seventh region (36) of the first conductivity positioned to form a fifth junction with the fifth region, the seventh region adapted to cooperate with the fourth and fifth regions to form a potential responsive capacitor (30), an eighth semiconductive region (region under contact 42) of the first conductivity type positioned to form a sixth junction with the sixth region, the eighth region adapted to cooperate with the fourth and sixth regions to form a transistor (21), conductive means (26, 27) connecting the seventh region to the base contact, conductive means (28, 25) connecting the fourth region to the first ohmic contact thereby forming a potential responsive phase shift network, conductive means connecting the emitter contact (43) to the sixth region (41) thereby forming amplifying means for cooperating with the phase shift network, a third ohmic contact (42) on the eighth region, the second (24) and third (42) contacts being adapted to be connected across means for energizing the device; and a fourth ohmic contact (29) on the fifth region adapted to be connected to means for providing a control potential for on-off control of the oscillations from the device.

References Cited

UNITED STATES PATENTS

| | | | |
|---|---|---|---|
| 2,816,228 | 12/1957 | Johnson | 331—108.4 |
| 3,165,708 | 1/1965 | Stelmak et al. | 331—108.4 |
| 3,183,453 | 5/1965 | Amlinger | 331—108.4 |

FOREIGN PATENTS

| | | |
|---|---|---|
| 882,974 | 11/1961 | Great Britain. |
| 892,959 | 4/1962 | Great Britain. |

ROY LAKE, *Primary Examiner.*

S. H. GRIMM, *Assistant Examiner.*

UNITED STATES PATENT OFFICE

CERTIFICATE OF CORRECTION

Patent No. 3,345,582 October 3, 1967

Joseph T. Maupin

It is certified that error appears in the above identified patent and that said Letters Patent are hereby corrected as shown below:

Column 8, line 73, "with the amplifying means to output circuit means." should read -- with the amplifying means output circuit means. --.

Signed and sealed this 17th day of February 1970.

(SEAL)
Attest:

Edward M. Fletcher, Jr.
Attesting Officer

WILLIAM E. SCHUYLER, JR.
Commissioner of Patents